US011594035B2

(12) United States Patent
Fillbrandt et al.

(10) Patent No.: US 11,594,035 B2
(45) Date of Patent: Feb. 28, 2023

(54) MONITORING DEVICE, AND METHOD FOR MONITORING A MAN OVERBOARD SITUATION

(71) Applicant: Robert Bosch GmbH, Stuttgart (DE)

(72) Inventors: Holger Fillbrandt, Bad Salzdetfurth (DE); Thorsten Ike, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 17/274,230

(22) PCT Filed: Jul. 10, 2019

(86) PCT No.: PCT/EP2019/068568
§ 371 (c)(1),
(2) Date: Mar. 8, 2021

(87) PCT Pub. No.: WO2020/048666
PCT Pub. Date: Mar. 12, 2020

(65) Prior Publication Data
US 2021/0312190 A1    Oct. 7, 2021

(30) Foreign Application Priority Data
Sep. 6, 2018    (DE) ...................... 10 2018 215 125.3

(51) Int. Cl.
*G06V 20/52*        (2022.01)
*G06T 7/215*        (2017.01)
(Continued)

(52) U.S. Cl.
CPC ............... *G06V 20/52* (2022.01); *G06T 7/11* (2017.01); *G06T 7/194* (2017.01); *G06T 7/215* (2017.01);
(Continued)

(58) Field of Classification Search
CPC .......... G06V 20/52; G06T 7/215; G06T 7/194; G06T 7/292; G06T 7/11;
(Continued)

(56) References Cited

U.S. PATENT DOCUMENTS 9,208,673 B2 *  12/2015  Grignan ................. G08B 21/08
11,079,486 B2 *  8/2021  Cappelletti ............. G01S 13/72

FOREIGN PATENT DOCUMENTS

DE       102016222134 A1    5/2018
WO         2017187407 A1   11/2017

OTHER PUBLICATIONS

Translation of International Search Report for Application No. PCT/EP2019/068568 dated Oct. 8, 2019 (2 pages).

* cited by examiner

*Primary Examiner* — Jae N Noh
(74) *Attorney, Agent, or Firm* — Michael Best & Friedrich LLP

(57) ABSTRACT

The invention relates to a monitoring device 1 for monitoring a man-overboard situation in a ship section 5, wherein the ship section 5 is monitored by video technology using at least one camera 2, and the camera 2 is designed to provide surveillance in the form of video data. The monitoring device comprises an analysis device 9, said analysis device 9 having an interface 10 for transferring the video data, and the analysis device 9 is designed to detect a moving object in the ship section 5 on the basis of the video data and determine a kinematic variable of the moving object. The analysis device 9 is also designed to determine a scale on the basis of the video data and the kinematic variable in order to determine the extent 8 of the moving object and evaluate the moving object as a man-overboard event on the basis of the extent 8 thereof.

14 Claims, 4 Drawing Sheets

(51) Int. Cl.
*G06T 7/194* (2017.01)
*G06T 7/292* (2017.01)
*G06T 7/11* (2017.01)
*G08B 5/22* (2006.01)
*G08B 21/02* (2006.01)
*H04N 5/232* (2006.01)
*H04N 7/18* (2006.01)

(52) U.S. Cl.
CPC ............... *G06T 7/292* (2017.01); *G08B 5/22* (2013.01); *G08B 21/02* (2013.01); *H04N 5/23222* (2013.01); *H04N 7/181* (2013.01); *G06T 2207/10016* (2013.01); *G06T 2207/30232* (2013.01); *G06T 2207/30241* (2013.01)

(58) Field of Classification Search
CPC ........... G06T 2207/10016; G06T 2207/30232; G06T 2207/30241; G08B 5/22; G08B 21/02; H04N 5/23222; H04N 7/181
See application file for complete search history.

MONITORING DEVICE, AND METHOD FOR MONITORING A MAN OVERBOARD SITUATION

BACKGROUND OF THE INVENTION

A monitoring device for monitoring a man overboard situation in a ship section is proposed. The ship section is monitored by video technology by means of at least one camera, the first camera being designed to provide the monitoring in the form of video data. The monitoring device comprises an analysis device which is designed to detect a moving object in the ship section based on the video data.

On ships, and especially on passenger ships and cruise ships, it is a known problem that passengers can fall overboard unnoticed during the voyage. Such events are referred to as man-overboard events. The chances of survival after such an event decrease with the time that elapses before the event is discovered.

Shipping companies are very interested in detecting a man-overboard event as soon as possible. Government regulations and/or insurance policies are also exerting increased pressure on shipping companies to include such events in their monitoring processes as far as possible.

In the case of cargo ships, for example, there is provision for equipping individuals with special armbands or other technology which they must wear or carry about their person in order to allow detection of man-overboard events. Radar-based methods are relatively expensive and require a large number of sensors.

Image—and/or video-based approaches have the problem of being susceptible to interference based on the wide range of possible events and objects, and due to a dynamic background of the moving vessel, with many events being detected and evaluated as false man-overboard events.

SUMMARY OF THE INVENTION

A monitoring device for monitoring a man overboard is provided. In addition, a method for man-overboard monitoring and a computer program are provided. Preferred and/or advantageous embodiments of the invention are obtained from the claims, the description and the attached figures.

A monitoring device for monitoring a man overboard situation in a ship section is proposed. In particular, the monitoring device may be designed to perform man-overboard monitoring in more than one section of the ship, in particular in connected or disjoint sections of the ship. In particular, the monitoring device is designed for man-overboard monitoring based on video and/or imaging technologies. The monitoring device can be used to determine whether a human being has fallen overboard or whether another, non-human, object is involved. For example, the ship section is a region surrounding a camera or a plurality of cameras. The ship section forms a spatial section. Preferably, the ship section includes a region beyond the railing and/or a portion of the sea.

The ship section is video-monitored by means of at least one camera. In particular, the ship section may be monitored using video and/or imaging technologies with a plurality of cameras. The cameras can have a common overlapping section, or alternatively the monitoring regions of the cameras are designed to be non-overlapping. The cameras are preferably color and/or black-and-white cameras. Alternatively, the camera can be a thermal imaging camera. The camera is designed to record a picture, a video and/or a sequence of images of the ship section. Furthermore, the camera is designed to be able to provide the images, the video and/or the image sequence to external sources as video data. The cameras are preferably arranged in such a way that they show a horizontal viewing direction. In addition, it may be provided that the cameras include in particular a viewing angle to the horizontal which is less than twenty degrees. In particular, the camera can thus be used to detect and/or record an object that falls overboard and/or lands in the sea. The specific ship sections are particularly safety-relevant sections of the ship, for example, sections accessible to persons and/or passengers and containing an area where there is a risk of falling into the sea. For example, a plurality of cameras are arranged on the ship being monitored, so that a plurality of sections of the ship are monitored, the cameras being designed to provide their video data to the monitoring device.

The monitoring device comprises an analysis device. The analysis device can be formed by a hardware module, or alternatively, a software module. For example, the analysis device is designed as a computer unit, as a processor or as a microchip. The analysis device has an interface for transferring the video data. The interface can be formed by a physical, for example a cable interface, a wireless interface, or a virtual interface. Preferably, the video data from a multiplicity of cameras and/or all cameras are provided to the analysis device for monitoring ship sections of the ship. In particular, the analysis device can also be designed to store the video data. It may also be provided that the analysis device forms a central analysis device, for example in a monitoring station of the ship.

The analysis device is designed to detect a moving object in the ship section based on the video data. For example, the analysis device analyses the video data for movements and/or objects. For this purpose, for example, the analysis device compares images and/or image sequences in the video data, in particular from one or more cameras. In particular, the analysis device can be designed to detect objects moving downwards in the ship section.

The analysis device is designed to determine a kinematic quantity for a moving object. For example, the kinematic quantity is the velocity of the object as a vector, as a magnitude and/or as a direction. Alternatively, the kinematic quantity can be a path, a pulse, a start point or an end point. Preferably, a plurality or all kinematic quantities of the object necessary to describe the motion of the object are determined. In particular, the analysis device determines the kinematic quantity for a multiplicity and/or all of the images of an image sequence and/or a video. Alternatively and/or in addition, it may be provided that the analysis device is designed to determine the kinematic quantity at specified time intervals, for example at intervals of 1 millisecond, 500 microseconds or one second.

The invention provides that the analysis device is designed to determine the moving object as a man-overboard event on the basis of its extent. The extent is in particular a surface extension, for example a diameter or a surface area. Alternatively, the extent can be formed by a volume dimension. The extent is, for example, a length, a width or a diameter of the object. In particular, the extent is a measure of the size of the object in reality. Preferably, the extent is the maximum longitudinal extension of an object. The extent of the object is determined, in particular, on the basis of the video data and the kinematic quantity. Preferably, the analysis device determines a scale, such as an imaging scale, from the kinetic quantity and the video data, wherein the extent of the object is determined on the basis of the scale. For example, the object in the video data is measured and/or determined based on the scale. The extent of the object is, in particular, a real extent. For example, the analysis device is designed to analyze the video data and/or the kinematic quantity of the object and/or the event belonging to the object, and to examine it for the possibility of a man-overboard event, wherein the verification or rejection as a man-overboard event is based on the extent of the object. For example, the analysis device is designed to analyze all accelerated movements, in particular accelerated movements directed vertically and/or directed towards the sea, as possible man-overboard events, wherein the rejection and/or verification of whether the event is a real man-overboard event is determined on the basis of the extent. In this way, for example, it is possible to rule out the possibility of a falling object, such as a cigarette, being incorrectly detected as a man-overboard event.

The invention is based on the consideration that in the current prior art, while purely video-based approaches are cost-effective in terms of their installation, the image processing algorithms are not yet sufficiently sensitive and robust that false detections are suppressed. Weather conditions and lighting scenarios, in particular, produce increased numbers of false alarms. In addition, the dynamic scenery with a great deal of movement, for example due to wave motion, spray, moving objects on water or on land, persons moving on board, birds and other events, makes the use of video-based approaches more difficult. However, the present invention provides a cost-effective means and a versatile monitoring device enabling a high reliability and robustness of the automatic detection of man-overboard events by means of video cameras. In particular, the monitoring device is characterized by a low probability of false alarms.

One design of the invention provides that the analysis device is designed to determine a free-fall acceleration as a kinematic quantity. For example, the analysis device is designed to determine accelerations of the object in the video data, for example by tracking over time and/or by analyzing the trajectory. Preferably, the free-fall acceleration and/or acceleration is determined in the vertical direction, in particular perpendicular to the surface of the sea. In particular, it may be provided that the trajectory is modeled as a ballistic parabola, wherein the free-fall acceleration is determined from the trajectory and/or ballistic parabola. For example, the motion is determined as a quadratic function and/or a polynomial, with the free-fall acceleration being interpreted in particular as the coefficient of the quadratic element. The free-fall acceleration measured and/or determined is compared in particular with a reference free-fall acceleration. This comparison is carried out in particular by the analysis device. The physical value of the acceleration due to gravity at the respective location is taken as the reference free-fall acceleration. For example, the value of the reference acceleration is 9.81 m/s$^2$. For example, based on the recognition that the free-fall acceleration measured in the video data must correspond to the acceleration due to gravity of 9.81 meters per second squared and/or the reference acceleration, the analysis device can determine a scale in the video data and/or the images and/or, in particular, thus determine the extent of the object. This finding is based on the consideration that given a measured free-fall acceleration and the comparison with a reference free-fall acceleration, it is possible to assign pixels to actual meters.

It is particularly preferable that the analysis device comprises a tracking module. For example, the tracking module is designed as a software module, alternatively as a hardware module such as a processor or a microchip. The tracking module is designed to determine a trajectory for the moving object based on the video data. For example, for this purpose an image sequence of the video data is analyzed in fixed and/or varying time steps and the path and/or course of the object is reconstructed and/or defined. The tracking of the object can be based on a graphical method, or alternatively on a numerical method and in particular by modeling, as a parabolic trajectory, for example. The analysis device is further designed to determine the kinematic quantity based on the trajectory. For example, by analyzing the trajectory, a direction of the velocity, a velocity and/or a free-fall acceleration can be determined. For example, the velocity is defined as the tangential vector to the trajectory at a given instant. In particular, the trajectory can be displayed to a user and/or can be made visible to the user, so that the user can also visually evaluate and/or track the event.

Optionally, the analysis device can comprise a selection module. The selection module is designed to determine the kinematic quantity of objects with parabolic trajectories. In particular, the selection module is designed to determine the trajectories and/or the kinematic quantities of objects with an accelerated motion in a vertical direction. Furthermore, the selection module is designed to exclude objects with a non-parabolic trajectory and/or objects without accelerated motion in a vertical direction from the determination of the kinematic quantity. For example, such objects and/or such events of unaccelerated vertical movement and/or without a parabolic trajectory are excluded as irrelevant events and/or their data is not monitored further. In particular, this allows data reduction to be performed for the actual analysis and/or for the determination of the extent. This design is based on the consideration that by prior filtering into objects and/or events that have accelerated motion and those that do not have accelerated motion, objects that are not falling freely, such as birds, spray and/or waves, can be excluded.

One design of the invention provides that the analysis device comprises a segmentation module. In particular, the segmentation module is implemented as a software module. The segmentation module is designed to segment a moving object in the video data, the individual images and/or the image sequence of the video data, as an object against a background. In particular, the segmentation module may be designed to segment the object against a dynamic background. The segmentation module in this case recognizes, for example, object sections that form a relationship and/or belong together. For example, a local significant difference and/or a deviation from the image background is determined. In particular, additional information can be used for segmentation, wherein the additional information assumes, for example, a continuous and/or constant path and/or trajectory. This design is based on the consideration that a moving object forms an extended object and has an object context, which can be determined by segmentation.

It is particularly preferred that the tracking module is designed to determine the trajectory based on the segmented object and, in particular, on the center of gravity of the segmented object. It may also be provided that the analysis device is designed to determine the kinematic quantity for the center of gravity of the segmented object. This design is based on the consideration that objects in free fall often have a rotational degree of freedom and so a point on the surface of the object changes over time, whereas the center of gravity follows the target parabola and/or trajectory.

It is particularly preferred that the analysis device is designed to determine a resolution in images of the video data based on the kinematic quantity. In particular, the resolution is understood as the assignment of pixels to meters, and/or generally, pixels to units of length. For example, the kinematic quantity is an acceleration value and/or an acceleration in the form of pixels per square centimeter. Once a reference acceleration due to gravity is known, for example 9.81 meters per second squared, a resolution can be determined by forming the ratio of the determined acceleration value to the reference acceleration due to gravity. By evaluating the object size in the video data and/or individual images, for example as a pixel size, the real extent and/or a real size of the falling object can be determined. Thus, it is possible to determine the extent of the falling and/or moving object without an explicit calibration of the camera and/or video data and thus to distinguish, for example, a falling person from a falling cigarette.

It is particularly preferred that the monitoring device comprises a first camera for providing the video data. The first camera is in particular a color camera, a black-and-white or a grayscale camera. The first camera is designed to monitor the ship section using video technology and to provide the video data. The monitoring of the ship section by the first video camera takes place in the visible wavelength range. In particular, the monitoring device may also comprise a multiplicity of first cameras to provide a multiplicity of video data. In particular, it is then provided that the analysis device forms a central analysis device, for example in a monitoring room, wherein the first cameras are connected to the analysis device for data communication.

It is particularly preferred that the monitoring device comprises a second camera for providing additional video data. In particular, the second camera is designed to monitor the same section of the ship as the first camera. The first camera and the second camera thus preferably image a common section of the ship. In particular, the second camera is an IR camera or a thermal imaging camera. In particular, it is provided that the first camera and the second camera will image the common ship section in different wavelength ranges. The combination of a first camera and a second camera in different wavelength ranges increases the processable wavelength range, and the detection reliability can be significantly increased. For example, during the night and in fog and/or bad weather a thermal camera and/or thermal imager can have significant advantages over a normal camera, whereas on hot summer days the thermal imager is inferior to the normal camera. In particular, the use of the first and second cameras allows the ship's crew to better verify an alarm and/or event. It is also preferable that the first camera and the second camera form a common camera module.

One design of the invention provides that the first camera, the second camera and/or the camera module contains and/or comprises the analysis device. This means that the determination of the extent and/or of the kinematic quantity is carried out in the first camera, the second camera and/or the camera module. Preferably, the analysis is carried out in the first camera and the second camera independently of each other. For example, the video data of the first camera and the video data of the second camera are evaluated independently of each other, for example, the kinetic quantities are determined independently and/or the extent of the object is determined independently. It may also be provided that the first camera and/or the second camera, in particular the camera module, is designed to output the video data, the kinetic quantity and/or the extent of the object as data. This design is based on the consideration that in confined situations on the ship it seems sensible to integrate the computing power into the cameras themselves, so that space for large-scale central computing devices can be reduced.

Optionally, the analysis device can be designed to issue an alarm when a man-overboard event is detected. For example, the monitoring device is designed to issue an alarm if a kinetic quantity exceeds or falls below a value, for example if it has a free-fall acceleration and/or a velocity; alternatively and/or, in addition, it may be provided that the alarm is issued if the extent is equal to a minimum extent and it can then be assumed that the object is a human being. In particular, in this case it is provided that the first camera, the second camera and/or the second camera can output an alarm or a signal for issuing an alarm, in addition to the video data.

It is particularly preferred that the analysis device, the first camera, the second camera and/or the camera module is designed to output the corresponding video data when an alarm is issued. For example, it is then possible that when an alarm is issued and/or a man-overboard event occurs, appropriate video data can be provided to a user directly, so that the user can decide quickly and efficiently whether further action is required.

It is particularly preferable that the analysis device comprises a modeling module. The modeling module comprises additional information, in particular about the ship section and/or the environment. For example, the model module includes information on the location of particularly dangerous areas, and/or areas where it is possible for a person to fall overboard. The analysis device in this case is designed to determine the kinematic quantity and/or the detection of the man-overboard event by taking account of the additional information. For example, the analysis device can exclude areas of the ship section where no man-overboard events can occur, for example because there is and/or can be no access to the sea there, and/or where sufficient safety measures have been taken to ensure that a person cannot fall overboard.

A further object of the invention is formed by a method for determining a man-overboard event. For this purpose, a ship is monitored using video technology by means of a camera and/or a plurality of cameras. The video monitoring provides video data, still images and/or image sequences. By analysis of the video data a kinematic quantity is determined, such as a free-fall acceleration in the vertical direction. Based on the determined kinematic quantity, an extent of the object is determined, for example by comparing a reference case acceleration with a determined acceleration, wherein a man-overboard event is deduced, in particular, when a minimum extent is exceeded.

A further object of the invention is a computer program, in particular a computer program stored on a data medium. The computer program is designed to carry out all steps of the method when the computer program is executed on a computer, the monitoring device and/or the analysis device.

A further object of the invention is a ship, in particular a passenger ship, having a ship section and the described monitoring device for monitoring a man overboard situation in the ship section.

BRIEF DESCRIPTION OF THE DRAWINGS

Further advantages, effects and embodiments are obtained from the attached figures and their description. In the drawings.

DETAILED DESCRIPTION

Figure 1:
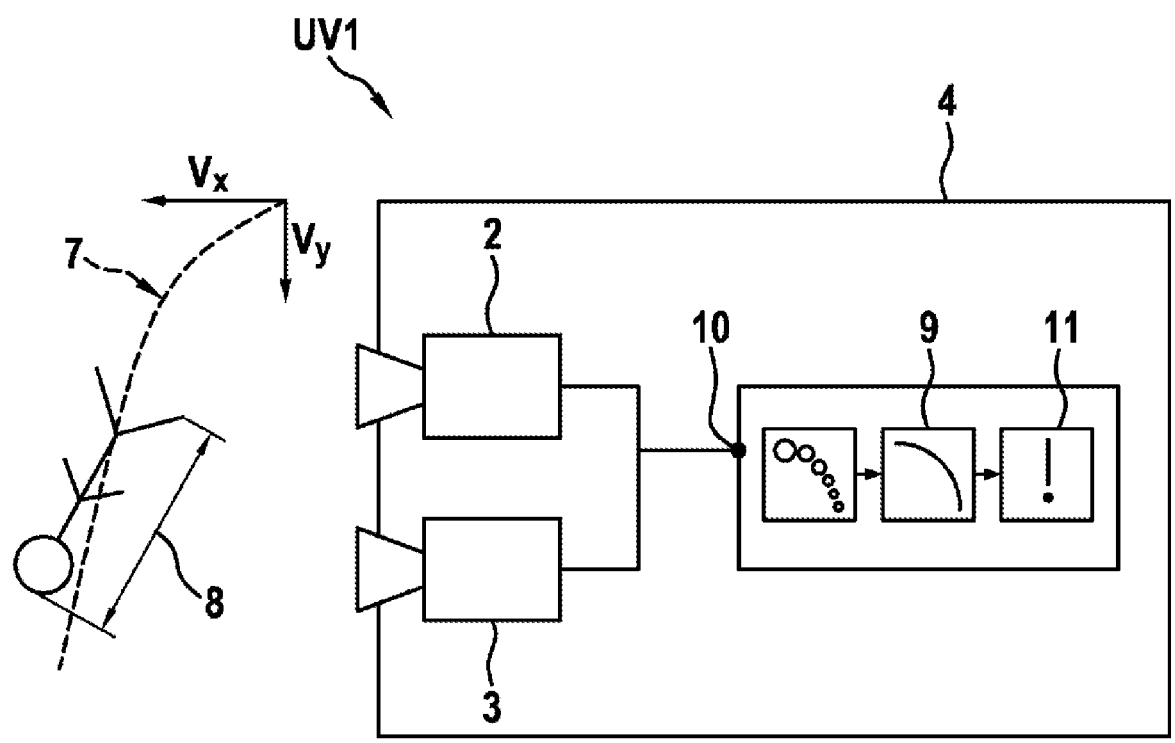
FIG. 1 shows a schematic diagram of a monitoring device.

FIG. 1 shows a monitoring device 1. The monitoring device 1 is used for monitoring a ship 12 and/or a ship section 5. By means of the monitoring device 1, it is possible to detect a person 6 falling overboard. In particular, the monitoring device 1 is used to find and/or monitor man-overboard events. By means of the monitoring device 1, in particular, a person falling overboard can be distinguished from other items falling overboard, such as cigarettes or garbage, in particular by a size comparison and/or an assessment of the extent of the object falling overboard. In addition, the monitoring device 1 can be used to distinguish between objects that go overboard, in particular falling objects, and objects moving in other ways or upwards, such as a bird.

The monitoring device 1 comprises two cameras, here a first camera and a second camera 3. The first camera 2 and the second camera 3 are arranged in a camera module 4. The camera module 4 is arranged on the ship in such a way that using this, and in particular also cameras 2 and 3, a ship section 5 can be monitored by video technology. The first camera 2 is designed as a color video camera to capture images in the visible wavelength range. The second camera 3 is designed as a thermal imaging camera and monitors the ship section 5 in the IR or NIR range. The first camera 2 and the second camera 3 are designed to provide video data. The video data includes the video surveillance of the ship section 5.

The ship section 5, for example, faces a region beyond the railing, in particular the sea and/or the exterior of the ship. Preferably, the monitoring device 4 is arranged in such a way that the first camera 2 and the second camera 3 have a horizontal viewing direction. A person 6, as an object that falls overboard and/or can fall overboard, can be detected by means of video monitoring by the camera module 4. A person 6 who falls overboard will describe a parabolic path 7 as a trajectory. The parabolic path 7 corresponds to a ballistic parabola which has a constant horizontal velocity Vx and a vertical velocity VY, where the vertical velocity VY is an accelerated motion. In addition, the person 6 has an extent 8, wherein the extent 8, for example, can be the height and/or size of the person 6 or else a diameter, for which, for example, a rectangle is circumscribed around the person 6, wherein the extent 8 would then be the diagonal of the rectangle.

The first camera 2 and the second camera 3 record the falling person 6 in the ship section 5 using video technology. This video monitoring is provided to an analysis device 9 as video data. The video data is provided to an interface 10, the interface 10 being comprised by the analysis device 9.

The analysis device 9 is designed to detect the moving object 6 in the ship section 5 based on the video data. In particular, the movement of the object 6 is tracked, for example in successive images in the video data. The determination of the moving object and/or the trajectory determination is performed independently for the video data of the second camera 3 and the first camera 2. Based on the tracked object 6, a kinetic quantity of the motion of the moving object, here the falling person 6, is determined. The kinetic quantity is the free-fall acceleration and/or the velocity profile in the vertical direction. In addition, the kinetic quantity may comprise a velocity or another physical quantity. Based on the kinetic quantity, here the measured free-fall acceleration, the video data is analyzed to determine the size and/or the extent 8 of the falling object. For example, the measured acceleration is compared with a reference free-fall acceleration, for example, the acceleration due to gravity. Once it is known what the value of the reference free-fall acceleration is, for example 9.81 m/s$^2$, and how many pixels per second squared in the image describe the free-fall acceleration, a scale can be defined, in this case the assignment of pixels to meters. By measuring the extent of the object and/or the person 6 in the image in terms of pixels, the extent 8 in the real world can then be determined. By comparing the extent 8 with a minimum extent, for example a minimum size for a human being, it is possible to determine whether the event is a potential man overboard situation and, if so, an alarm is issued. If the measured and/or determined extent 8 falls below the minimum extent, the event is considered not to be of concern and discarded. If a man-overboard event is present or suspected, an alarm 11, such as an audible alarm, can be issued. Preferably, the image material of the corresponding location and/or the corresponding camera 2, 3 is provided at the same time as the alarm 11.

Figure 2:
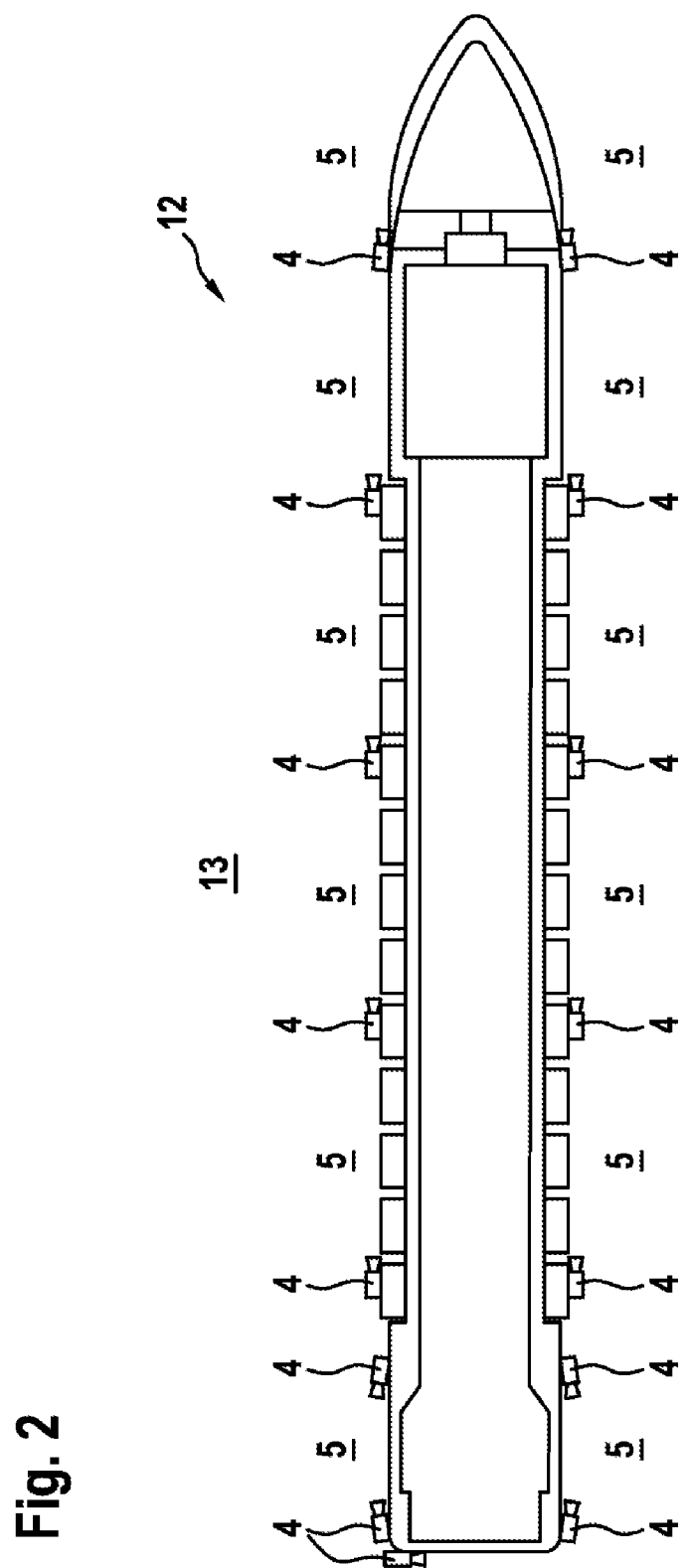
FIG. 2 shows an exemplary camera distribution on a ship.

FIG. 2 shows a ship 12. The ship 12 is shown in plan view. The ship 12 is in particular a passenger ship and preferably a vacation ship. The external areas 13 of the ship are monitored by camera modules 4. The camera modules 4 are designed in particular as described above. The camera modules 4 are arranged on the outer sides of the ship 12 in such a way that they have a horizontal viewing direction and each monitor one section of the ship using video technology. One ship section 5 is monitored per camera module 4. At least as many camera modules 4 are provided as there are monitoring areas 5. By installing the camera modules 4 in this way, the entire external area of the ship is monitored, so that man-overboard events can be detected. The camera modules 4 can be connected to a central analysis device, wherein this is arranged, for example, in a monitoring room, where all the alarms of the camera modules 4 converge and, if appropriate, the video material is visible.

Figure 3:
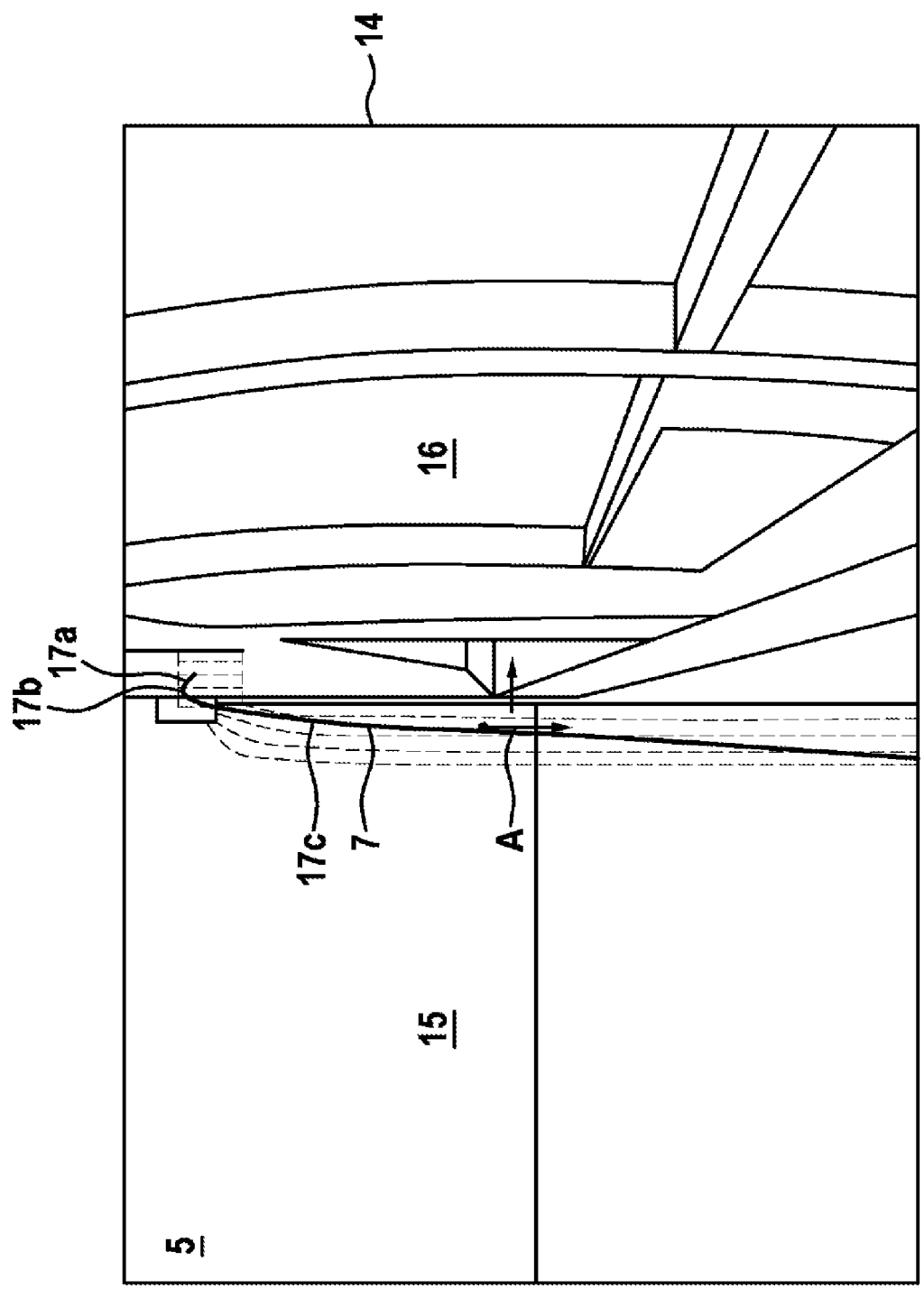
FIG. 3 shows an exemplary trajectory.

FIG. 3 shows an image 14 of the video data, recorded with one of the cameras 2 or 3. Image 14 shows the ship section 5, which is divided into an external region 15 and a ship region 16. The ship region 16 shows parts of the ship, here an outer wall. In addition, the path 7 followed by a falling person is shown. The falling person jumps off the deck and in the first section describes an ascending parabola branch 17a, which after the vertex 17b transitions into a descending parabola section 17c. The path 7 has been tracked or modeled by the analysis device 9 in the form of a trajectory. From the trajectory, here the parabolic shape of the path 7, the free-fall acceleration A can be determined, wherein the free-fall acceleration A is compared with a reference acceleration due to gravity g, and so in image 14 the size of the falling object can be deduced and thus the extent of the object is determined.

Figure 4:
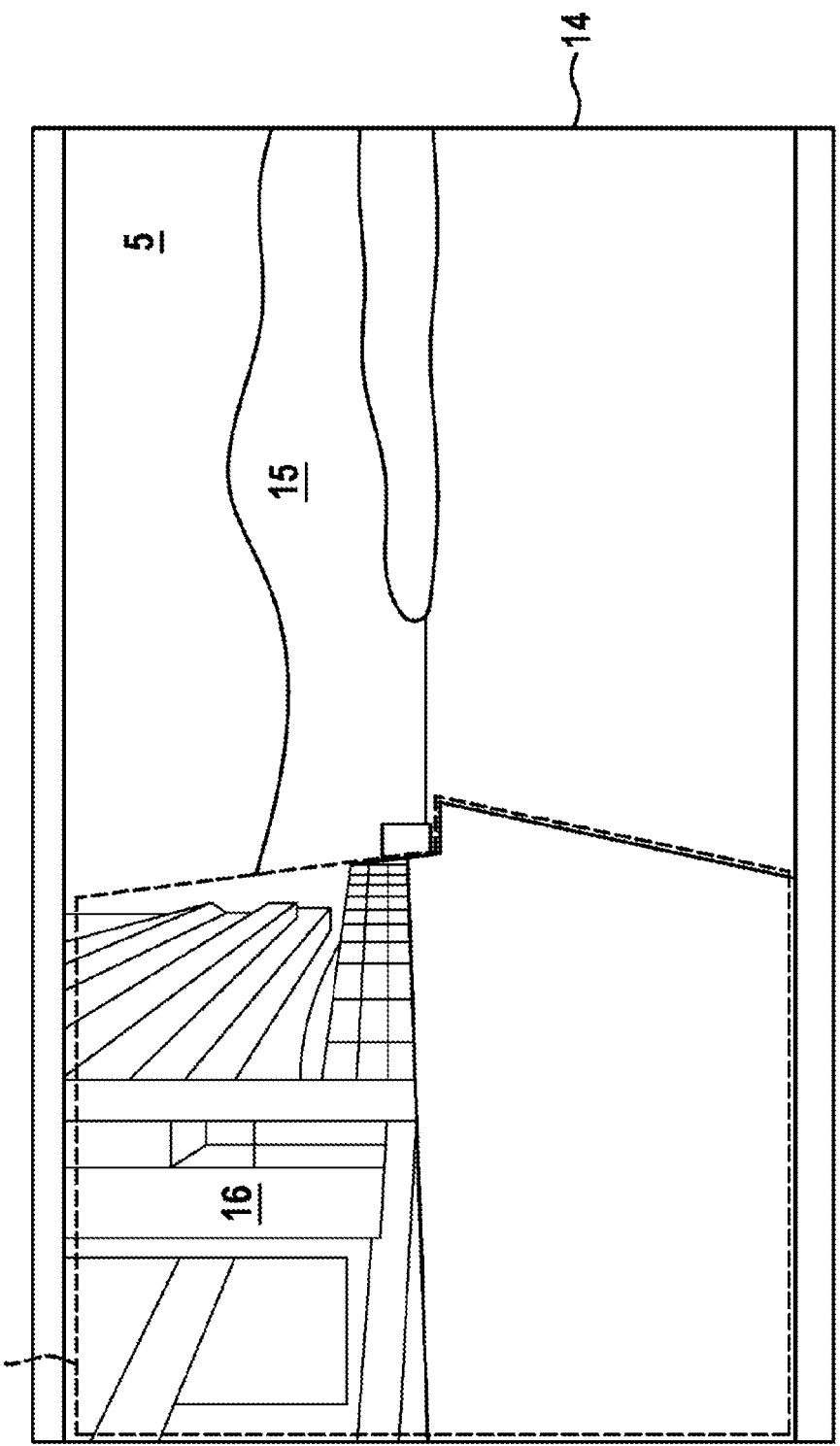
FIG. 4 shows an image with additional information.

FIG. 4 also shows an image 14, taken by one of the cameras 2 or 3, wherein here also the ship section 5 is bisected into an exterior region 15 and a ship region 16. Using a modeling module which is part of the monitoring device 1, additional information can be and/or is stored, wherein in this case a model of the ship section 5 is stored, with the ship section 16 being excluded from the analysis with the result that a robust, data-efficient and lean analysis of the video data is possible, for example. A further exclusion criterion for a man-overboard event is a distance from the parabola vertex to the edge of the ship. The exclusion here can be indicated by marking an exclusion zone. Preferably, the monitoring device 1 is designed such that a user can mark the ship region 16 in the image 14 via a human-machine interface when configuring the monitoring device 1, the modeling module being designed to store this as additional information. In addition, the monitoring device 1 is designed such that when configuring the monitoring device 1 via the human-machine interface, a user can mark image regions of particularly dangerous areas and/or areas from which a person can fall overboard. Alternatively or additionally, the monitoring device 1 is designed such that when configuring the monitoring device 1 via the human-machine interface, a user can mark image regions of areas in which man-overboard events cannot occur.

The invention claimed is:

1. A monitoring device (1) for monitoring a man overboard situation in a ship section (5), the monitoring device comprising:
    at least one camera (2), the camera (2) being configured to monitor the ship section (5) and to provide the monitoring in the form of video data,
    an analysis device (9), the analysis device (9) including an interface (10) for transferring the video data,
    wherein the analysis device (9) is configured to
        detect a moving object in the ship section (5) based on the video data and to determine a kinematic quantity of the moving object, and
    to determine a scaling based on the video data and the kinematic quantity in order to determine an extent (8) of the moving object and to evaluate the moving object as a man-overboard event based on the extent (8) thereof.

2. The monitoring device (1) as claimed in claim 1, wherein the analysis device (9) is configured to determine a measured free-fall acceleration as the kinematic quantity and to compare the measured free-fall acceleration (A) with a reference free-fall acceleration in order to determine the extent (8).

3. The monitoring device (1) as claimed in claim 1, wherein the analysis device (9) comprises a tracking module, wherein the tracking module is configured to determine a trajectory for the moving object based on the video data, wherein the kinetic quantity can be determined from the trajectory.

4. The monitoring device (1) as claimed in claim 3, wherein the analysis device (9) comprises a selection module, the selection module being configured to determine the kinematic quantity of objects with parabolic trajectories and/or to exclude objects with non-parabolic trajectories from the determination of the kinematic quantity.

5. The monitoring device (1) as claimed in claim 1, wherein the analysis device (9) has a segmentation module, the segmentation module being configured to segment a moving object in the video data as an object against a background.

6. The monitoring device (1) as claimed in claim 5, wherein the tracking module is configured to determine the trajectory based on the center of gravity of the segmented object.

7. The monitoring device (1) as claimed in claim 1, wherein the analysis device (9) is configured to determine a resolution in images (14) of the video data based on the kinematic quantity.

8. The monitoring device (1) as claimed in claim 1, further comprising a second camera (3) for providing further video data, wherein the first camera (2) and the second camera (3) monitor a common region, the analysis device (9) being configured to analyze the video data of the first camera (2) and the second camera (3) separately.

9. The monitoring device (1) as claimed in claim 1, wherein the analysis device (9) is comprised by the first and/or second camera (2, 3).

10. The monitoring device (1) as claimed in claim 1, wherein the monitoring device (1) is configured to issue an alarm when a man-overboard event is detected.

11. The monitoring device (1) as claimed in claim 10, wherein the analysis device (9) is configured to output video data corresponding to an alarm.

12. The monitoring device (1) as claimed in claim 1, wherein the analysis device (9) comprises a modeling module, wherein the modeling module comprises additional information relating to the ship section (5) and/or additional information relating to the ship section (5) can be provided, the analysis device (9) being configured to determine the kinematic quantity with the inclusion of the additional information.

13. A method for determining a man-overboard event, the method comprising:
    monitoring a ship section (5) using a camera (2) to generate video data,
    determining based on the video data a kinematic quantity of a moving object, and
    determining a scaling of the object based on the video data and the kinematic quantity,
    determining an extent of the object based on the scaling, and
    evaluating the moving object as a man-overboard event based on the extent.

14. A non-transitory, computer-readable medium containing instructions that when executed by a computer cause the computer to
    control a camera to generate video data of a monitored ship section,
    determine based on the video data a kinematic quantity of a moving object,
    determine a scaling of the object based on the video data and the kinematic quantity in order to determine an extent of the moving object, and
    evaluate the moving object as a man-overboard event based on the extent.

* * * * *